(12) United States Patent
Hartig et al.

(10) Patent No.: US 7,357,048 B2
(45) Date of Patent: Apr. 15, 2008

(54) BALL SCREW DRIVE

(75) Inventors: Gunter Hartig, Herzogenaurach (DE);
Jurgen Osterlanger, Emskirchen (DE);
Dieter Adler, Herzogenaurach (DE);
Manfred Kraus, Herzogenaurach (DE);
Ralf Mayer, Herzogenaurach (DE);
Jorg Wagner, Oberreichenbach (DE);
Horst Munck, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/122,384

(22) Filed: May 5, 2005

(65) Prior Publication Data

US 2005/0252320 A1 Nov. 17, 2005

(30) Foreign Application Priority Data

May 12, 2004 (DE) ............... 10 2004 023 354

(51) Int. Cl.
*F16H 1/24* (2006.01)
*F16H 55/02* (2006.01)

(52) U.S. Cl. ................ 74/424.83; 74/89.23

(58) Field of Classification Search .......... 74/89.42, 74/424.86, 424.82, 424.83, 424.84, 424.87, 74/89.23, 471

See application file for complete search history.

(56) References Cited

U.S. PATENT DOCUMENTS 5,048,364 A * 9/1991 Minamoto et al. ........... 74/493

| | | | |
|---|---|---|---|
| 5,809,838 A * | 9/1998 | Miyaguchi et al. | 74/89.44 |
| 6,082,209 A * | 7/2000 | Yabe et al. | 74/424.83 |
| 6,439,338 B2 * | 8/2002 | Yoshioka et al. | 180/444 |
| 6,851,722 B2 * | 2/2005 | Chiu et al. | 285/134.1 |
| 6,874,939 B2 * | 4/2005 | Michioka et al. | 384/45 |
| 7,040,189 B2 * | 5/2006 | Michioka et al. | 74/424.82 |
| 2003/0172759 A1 * | 9/2003 | Hayashi | 74/424.86 |
| 2004/0200303 A1 * | 10/2004 | Inoue et al. | 74/424.75 |

FOREIGN PATENT DOCUMENTS

| | | |
|---|---|---|
| DE | 38 08 989 C 2 | 9/1988 |
| DE | 38 14 061 C 2 | 9/1989 |
| DE | 41 42 983 C 2 | 8/1992 |
| DE | 43 16 423 A 1 | 11/1994 |
| DE | 101 55 454 A 1 | 5/2002 |
| DE | 103 04 868 A 1 | 8/2003 |
| DE | 102 42 297 A 1 | 3/2004 |
| EP | 0 8 814 012 B 1 | 12/1997 |

* cited by examiner

*Primary Examiner*—Richard Ridley
*Assistant Examiner*—James Pilkington
(74) *Attorney, Agent, or Firm*—Charles A. Muserlian

(57) ABSTRACT

A ball screw drive comprising a spindle nut (2) that can be disposed on a spindle (1), said spindle nut (2) comprising on an inner periphery, a ball groove (3) that is arranged along a helix and defines a load-bearing channel (8) for balls (5), an external deflector (6, 24) arranged outside of the spindle nut (2) connecting the two ends of the load-bearing channel (8) endlessly to each other for deflecting the balls (5) from one of the two ends of the load-bearing channel (8) to the other of the two ends of the load-bearing channel (8), a drive pinion for driving the spindle nut (2) being arranged on the spindle nut (2), wherein the external deflector (6, 24) is arranged at least substantially within an axial length of the drive pinion.

7 Claims, 2 Drawing Sheets

BALL SCREW DRIVE

FIELD OF THE INVENTION

The invention concerns a ball screw drive that is used, for example, as a component of an electromechanical steering boost in steering equipments of automotive vehicles.

BACKGROUND OF THE INVENTION

EP 0 814 012 B1, for instance, discloses an electric steering booster device incorporating a ball screw drive. In this prior art, an axial extension of a toothed rack comprises a spindle on which a spindle nut is arranged. Balls arranged between the spindle and the spindle nut roll in ball grooves configured on the inner periphery of the spindle nut and the outer periphery of the spindle. These ball grooves define a load-bearing channel in which the balls roll under load. For forming an endless circuit of balls, the spindle nut comprises a so-called external deflector that connects the two ends of the load-bearing channel endlessly to each other. The external deflector winds around approximately 180° about the outer periphery of the spindle nut. At the end of the load-bearing channel that generally comprises several windings, the balls are deflected into the external deflector. Within this deflector, the balls move in the load-free return channel. They are deflected from there to the beginning of the load-bearing channel and roll again along the ball grooves. At its axial ends, the spindle nut is supported radially through a groove ball bearing. Further, a toothed wheel is arranged rotationally fast on the spindle nut and meshes with a drive pinion of an electromotor. The toothed wheel is arranged axially spaced from the external deflector. This arrangement has a considerable design space requirement in axial direction.

OBJECTS OF THE INVENTION

It is an object of the invention to provide a ball screw drive of the pre-cited type that permits smaller overall dimensions in the axial direction.

This and other objects and advantages of the invention will become obvious from the following detailed description.

SUMMARY OF THE INVENTION

The invention achieves the above objects by the fact that the external deflector is arranged at least substantially within the axial length of a drive pinion that is configured, for example, as a toothed wheel. Advantageously, the axial design space requirement of the toothed wheel is additionally utilized for accommodating the external deflector. In this way, the total axial design space requirement is considerably reduced. Further, the enveloping of the external deflector offers protection from undesired influences on the external deflector. Compact elements are a necessity, particularly in the field of automotive vehicles.

Preferably, a toothed belt wheel constituting the drive pinion comprises a toothed rim that comprises an outer gearing and defines an annular space configured within the toothed belt wheel, in which annular space the outer deflector is arranged. The annular space may be interrupted in peripheral direction but is preferably configured continuously in this direction. Such toothed belt wheels can be made, for instance, as die-cast parts, injection molded parts but also as sintered parts. The outer deflector may be configured as a tubular element that is lodged in this annular space.

The toothed belt wheel is arranged rotationally fast on the spindle nut, preferably through a hub, the toothed rim being firmly fixed to the hub by a radial web that is arranged preferably on one axial end of the toothed belt wheel. Due to the radial web arranged in the region of the one axial end, a sufficiently large annular space in which the external deflector can be accommodated is made available.

In a known manner, the external deflector comprises a return channel for the balls, the two ends of said return channel being connected to the two ends of the load-bearing channel. The external deflector of the invention has a multi-piece configuration and comprises a parting plane along and within the return channel.

The return channel has an approximately circular cross-section and each deflecting part comprises a ball groove that defines this return channel. The division along and within the return channel enables a simple configuration of the ball grooves to be provided on the external deflector. For instance, it becomes possible to use injection molds of a simple configuration that already comprise the required ball grooves. In this way, the external deflector can be made economically out of a plastic by an injection method.

In a particularly favorable manner, one of the deflecting parts of the multi-piece external deflector can be made integrally with the drive pinion. In this embodiment of the invention, the total number of parts is reduced. Such a toothed wheel or toothed belt wheel is made preferably out of a plastic by injection.

Alternatively, the external deflector may be made as a deflecting element separate from the toothed wheel and preferably out of a plastic, the deflecting parts of the deflecting element being connected to each other by positive engagement, force engagement or by a fusion of materials.

To achieve a perfect positioning of the deflecting element in the annular space, it can be advantageous to embed the deflecting element in a molding compound. The annular space is filled with the molding compound, so that the deflecting element is more or less enveloped by the molding compound. After the molding compound has hardened, a perfect positioning of the deflecting element relative to the spindle nut is guaranteed. The molding compound may be, for example, a plastic and can be chosen so that a desired noise damping is improved. If, for example, the toothed wheel or the toothed belt wheel is made of steel, a properly chosen molding compound contributes to damping vibration transmissions. In place of the molding compound, it is also possible to use a foam having permanent elastic properties after hardening.

The number of parts can be reduced further if the spindle nut comprises an integrally formed ball groove on its outer periphery that serves to mount the spindle nut radially through a radial ball bearing. A separate inner ring for the radial ball bearing can thus be dispensed with.

The invention will now be described more closely with reference to two examples of embodiment illustrated in a total of six figures

DETAILED DESCRIPTION OF THE INVENTION

Figure 1:
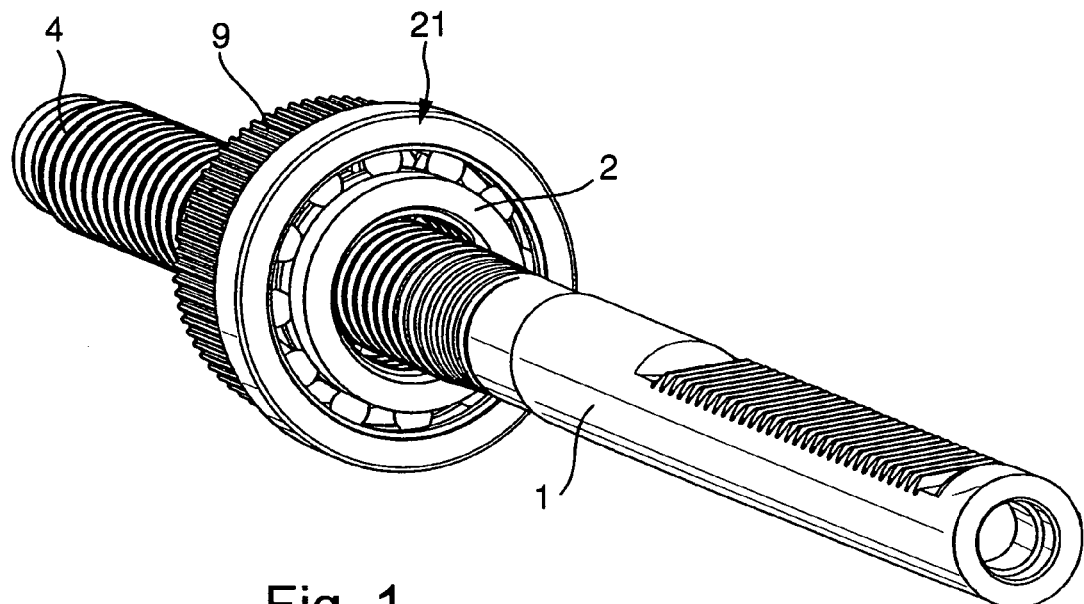
FIG. 1 is a perspective representation of a ball screw drive of the invention.

The ball screw drive of the invention illustrated in FIGS. 1-5 comprises a spindle nut 2 that is disposed on a spindle 1, said spindle nut 2 comprising on an inner periphery, a ball groove 3 arranged along a helix. The spindle 1 comprises on its outer periphery a ball groove 4 that is arranged along a helix. Balls 5 are arranged between the spindle nut 2 and the spindle 1 and roll on the ball grooves 3 and 4 when the spindle nut 2 is rotated relative to the spindle 1. The spindle nut 2 further comprises an external deflector 6 for deflecting the balls from one end of the ball groove 3 to the other end of the ball groove 3.

A return channel 7 for the balls 5 is configured within the external deflector 6. A load-bearing channel 8 for the balls 5 is configured between the spindle nut 2 and the spindle 1 and is defined by the ball grooves 3, 4. The return channel 7 connects the two ends of the load-bearing channel 8 endlessly to each other, each of the two ends of the return channel 7 being connected to one end of the load-bearing channel 8.

A toothed belt wheel 9 is arranged rotationally fast on the spindle nut 2. The toothed belt wheel 9 is surrounded by a toothed belt, not shown, that further surrounds a drive pinion of an electromotor, likewise not shown.

Figure 2:
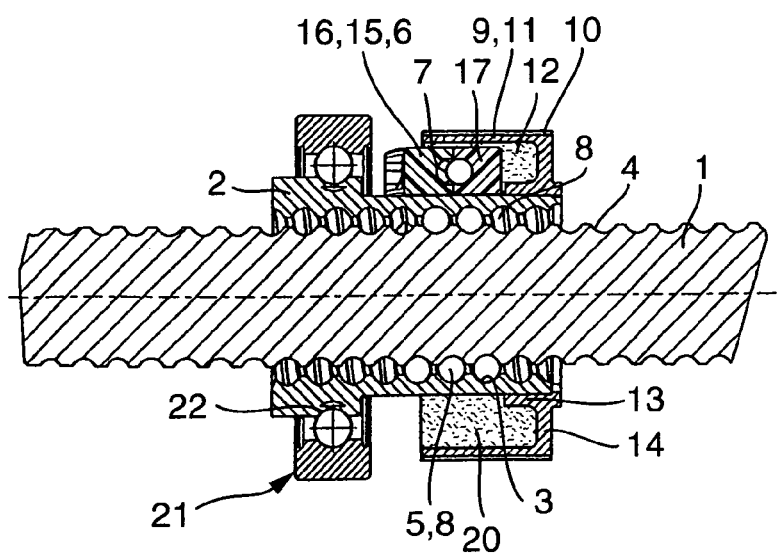
FIG. 2 shows the ball screw drive of the invention of FIG. 1 in a longitudinal section.

From FIG. 2, it can be seen that the external deflector 6 is arranged substantially within the axial length of the toothed belt wheel 9. For this purpose, the toothed belt wheel 9 comprises a toothed rim 11 that comprises an outer gearing 10 and defines an annular space 12 that is configured within the toothed belt wheel 9. The annular space 12 is defined on the other side by the outer periphery of the spindle nut 2. The annular space 12 mainly accommodates the external deflector 6.

The toothed belt wheel 9 further comprises a hub 13 that is fixed rotationally fast on the outer periphery of the spindle nut 2. The toothed rim 11 is connected integrally by a radial web 14 to the hub 13, said radial web 14 being arranged on one axial end of the toothed belt wheel 9. Due to the one-sided arrangement of the radial web 14, a large annular space 12 is guaranteed.

Figure 3:
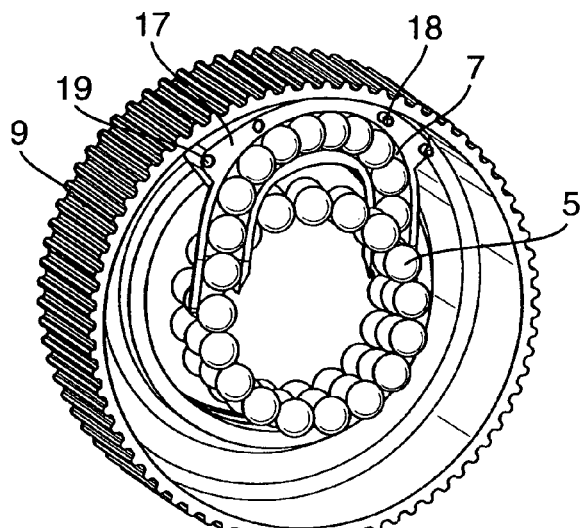
FIG. 3 is a representation of a toothed wheel of the ball screw drive of the invention of FIG. 1, with external deflector and balls.
Figure 4:
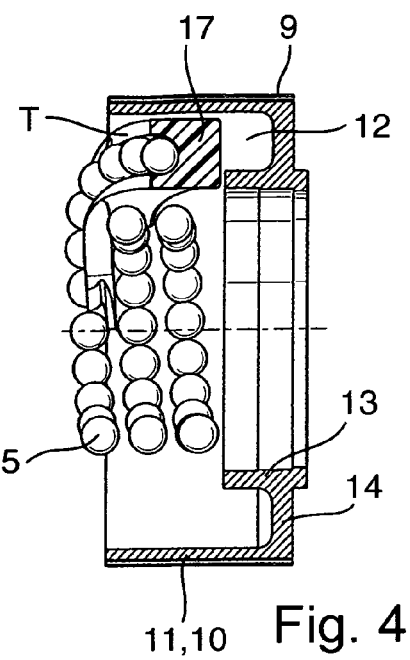
FIG. 4 is a further representation of the toothed wheel of the ball screw drive of the invention of FIG. 1, with external deflector and balls.
Figure 5:
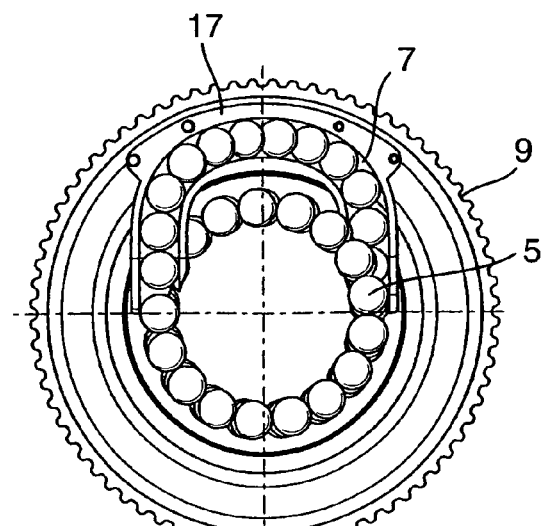
FIG. 5 is a further representation of the toothed wheel of the ball screw drive of the invention of FIG. 1, with external deflector and balls.

In the present embodiment, the external deflector 6 has a multi-piece configuration, a parting plane T being arranged along and within the return channel 7. The parting plane T is shown in FIGS. 3-5. The external deflector 6 with a two-piece configuration is shown in FIG. 2. This external deflector 6 is configured as a deflecting element 15 that is made separately from the toothed belt wheel 9 and preferably out of a plastic by injection. In the present embodiment, the two deflecting parts 16, 17 are connected to each other by positive and by force engagement.

FIGS. 3-5 show only one of the deflecting parts 17. This deflecting part 17 comprises axially projecting pins 18 and receptions 19. The other deflecting part 16 likewise comprises such pins and receptions. The pins 18 of both the deflecting parts 16, 17 enter into positive and force engagement with the receptions 19 of the respective other deflecting part 16, 17.

Due to the fact that the parting plane T is arranged along and within the return channel 7, it is possible to use simple injection molds to form ball grooves on the deflecting parts 16, 17, which ball grooves together define the return channel 7.

In the example of embodiment of FIG. 2, the deflecting element 15 is embedded in a molding compound 20 with which the annular space 12 is filled. Upon hardening of this molding compound, the deflecting element 15 is perfectly positioned within the toothed belt wheel 9 and relative to the spindle nut 2.

The spindle nut 2 is radially mounted through a radial ball bearing 21, one ball groove 22 of the radial ball bearing 21 being integrally formed on the outer periphery of the spindle nut 2.

Figure 6:
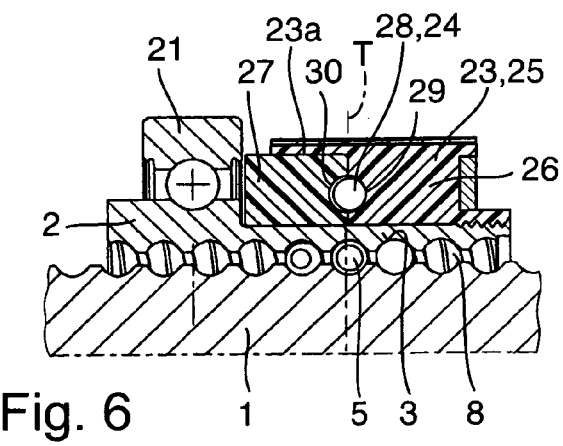
FIG. 6 shows a longitudinal section through a further ball screw drive of the invention.

Whereas in this example of embodiment, the deflecting element 15 is made separately from the toothed belt wheel 9, it is possible in other advantageous embodiments, to make at least one of the deflecting parts integrally with the toothed belt wheel. One such embodiment is illustrated in FIG. 6.

In this ball screw drive of the invention, a toothed belt wheel 23 is arranged on a spindle nut 2. An external deflector 24 for balls 5 is arranged within the axial length of the toothed belt wheel 23 in an annular space 23a. The main difference to the example of embodiment described above is that the external deflector 24 is formed by a multi-piece deflecting element 25, one of the deflecting parts 26 being configured integrally with the toothed belt wheel 23. The other deflecting part 27 can be made separately. The parting plane T in this embodiment is likewise configured along and within the return channel 28, and the two deflecting parts 26, 27 define with their integrally formed ball grooves 29, 30, the return channel 28. The number of parts in this example of embodiment is reduced.

The invention claimed is:

1. A ball screw drive comprising a spindle nut that can be disposed on a spindle, said spindle nut comprising on an inner periphery, a ball groove that is arranged along a helix and defines a load-bearing channel for balls, an external deflector arranged outside of the outer circumference of the spindle nut connecting two ends of the load-bearing channel endlessly to each other for deflecting the balls from one of the two ends of the load-bearing channel to the other of the two ends of the load-bearing channel, a drive pinion for driving the spindle nut being arranged on the spindle nut, and the external deflector being arranged within the axial length of the drive pinion wherein the drive pinion is constituted by a toothed belt wheel which comprises a toothed rim that comprises an outer gearing and defines an annular space which is configured within the toothed belt wheel, the external deflector being arranged in said annular space between the outer circumference of the nut and the inner circumference of the toothed rim to protect the external deflector.

2. A ball screw drive of claim 1, wherein the toothed belt wheel comprises a hub that is ranged rotationally fast on the spindle nut, the toothed rim being firmly connected to the hub through a radial web that is ranged on one axial end of the toothed belt wheel.

3. A ball screw drive of claim 1, wherein the external deflector comprises a return channel for the balls, two ends of said return channel being connected to the two ends of the load-bearing channel, and the external deflector is configured as a multi-piece deflecting element that comprises a parting plane along and within the return channel.

4. A ball screw drive of claim 3, wherein one deflecting part of the multi-piece external deflector is made integrally with the drive pinion.

5. A ball screw drive of claim 1, wherein the external deflector is made as a deflecting element separately from the toothed wheel and out of a plastic, deflecting parts of the deflecting element being connected to each other by one of positive engagement, force engagement or fusion of materials.

6. A ball screw drive of claim 5, wherein the deflecting element arranged in the annular space is embedded in a molding compound.

7. A ball screw drive of claim 1, wherein the spindle nut is mounted radially through a radial ball bearing and comprises an integrally formed ball groove of said radial ball bearing.

* * * * *